United States Patent
Obana et al.

(10) Patent No.: US 8,166,747 B2
(45) Date of Patent: May 1, 2012

(54) GAS TURBINE ENGINE

(75) Inventors: Mitsuru Obana, Derby (GB); Paul Fletcher, Rugby (GB); Christopher J B Barkey, Quebec (CA); Torbjorn O Lindquist, Derby (GB); Andrew M Rolt, Derby (GB)

(73) Assignee: Rolls-Royce plc, London (GB)

( * ) Notice: Subject to any disclaimer, the term of this patent is extended or adjusted under 35 U.S.C. 154(b) by 1192 days.

(21) Appl. No.: 11/717,159

(22) Filed: Mar. 13, 2007

(65) Prior Publication Data
US 2007/0214766 A1    Sep. 20, 2007

(30) Foreign Application Priority Data
Mar. 16, 2006    (GB) .................................. 0605248.4

(51) Int. Cl.
*F02G 1/00* (2006.01)
(52) U.S. Cl. .................... 60/39.511; 60/39.55
(58) Field of Classification Search ................ 60/39.55, 60/39.511, 39.182
See application file for complete search history.

(56) References Cited

U.S. PATENT DOCUMENTS

| | | | |
|---|---|---|---|
| 4,393,649 A | 7/1983 | Cheng | |
| 4,509,324 A | 4/1985 | Urbach | |
| 4,569,195 A | 2/1986 | Johnson | |
| 5,727,377 A | 3/1998 | Fetescu | |
| 5,896,740 A | 4/1999 | Shouman | |
| 6,782,703 B2 * | 8/2004 | Dovali-Solis | 60/785 |
| 6,845,738 B2 | 1/2005 | Frutschi | |
| 2001/0022075 A1 * | 9/2001 | Mandai et al. | 60/39.141 |
| 2002/0100271 A1 | 8/2002 | Viteri | |
| 2005/0193714 A1 * | 9/2005 | Walsh et al. | 60/39.53 |
| 2006/0032232 A1 * | 2/2006 | Takai et al. | 60/772 |
| 2008/0010967 A1 * | 1/2008 | Griffin et al. | 60/39.182 |

FOREIGN PATENT DOCUMENTS

| | | |
|---|---|---|
| FR | 2092741 A1 | 1/1972 |
| JP | 10047018 A1 | 2/1998 |
| JP | 10-47018 A | 10/1998 |

OTHER PUBLICATIONS

Makansi, Jason; "Gas Turbines Grab Wider Share of Power Generation Duties", Generation Technology, Mar. 1, 1990, pp. 40-42, 44, vol. 134 No. 3, Power, McGraw-Hill Company, New York, NY, US.
European Search Report issued in counterpart application, Jun. 2, 2008.

* cited by examiner

*Primary Examiner* — William H Rodriguez
*Assistant Examiner* — Young Choi
(74) *Attorney, Agent, or Firm* — Jeffrey S. Melcher; Manelli Selter PLLC

(57) ABSTRACT

A steam injection gas turbine engine having a once-through steam generator (OTSG). A condenser is provided downstream of the OTSG to capture water and is protected from hot flue gasses during startup by a bypass circuit. Optionally, heating the exhaust downstream of the condenser using coolant taken from an intercooler provides plume suppression.

12 Claims, 4 Drawing Sheets

GAS TURBINE ENGINE

CROSS-REFERENCE TO RELATED APPLICATIONS

This application claims priority to GB 0605248.4, filed 16 Mar. 2006.

BACKGROUND OF THE INVENTION

This invention concerns gas turbine engines and, more particularly but not exclusively, gas turbine engines in which steam is injected and a method of operating such engines.

Steam injection is employed on industrial engines to reduce NOx emissions and boost power. The specific fuel consumption of the engine can also be improved as the steam is usually raised using engine exhaust heat, in a heat recovery steam generator (HRSG).

In one known system, described in U.S. Pat. No. 4,569,195, a steam injection gas turbine has an intercooler situated between a low-pressure compressor and a high pressure compressor. Water is used as the coolant in the intercooler to reduce the temperature of the air before it enters the high pressure compressor thereby reducing the volumetric flow rate entering, and consequently the work required to drive, the high pressure compressor. More power can thus be extracted from the power turbine. The HRSG takes water from the intercooler and generates steam that may be injected to various parts of the gas turbine, including the combustor and the turbines. The steam injection increases the mass flow and the enthalpy of the working fluid passing through the turbines, resulting in further power extraction from the turbines.

Generally, the flow rate through the intercooler necessary to cool the air flow to the high pressure compressor is much higher than the steam injection flow rate. For the system described in U.S. Pat. No. 4,569,195, in its practical implementations, excess water from the intercooler is dumped from the cycle or re-circulated after cooling in another large heat exchanger at the cost of reduced utilisation of the heat absorbed by that water in the intercooler and that heat is lost to the cycle. Reducing the flow rate of water through the intercooler to match that of the rate of steam injection does not always contribute to the improvement of the overall thermal efficiency or plant economics. Firstly, reducing the flow rate of the water through the intercooler is only possible within the range that the water temperature does not exceed the air temperature in the intercooler. Secondly, when the final steam temperature from the HRSG is fixed, with the hotter feed water temperature to the HRSG resulting from the reduced water flow rate at the intercooler the exhaust temperature at the exit of the HRSG increases. Namely, the intercooler just substitutes some part of water pre-heating in the HRSG without achieving any improvement in the efficiency. In order to improve the thermal efficiency by utilising the heat from the intercooler, the final steam temperature from the HRSG needs to be increased and the exhaust temperature at the exit of the HRSG needs to be maintained or decreased. To improve the overall efficiency with the hotter feed water temperature to the HRSG, in the case of the reduced water flow rate at the intercooler, the HRSG has to be much larger and more expensive because the hotter feed water temperature to the HRSG reduces the mean temperature difference between the exhaust side and water side of the HRSG and that determines HRSG sizing.

A further problem with injecting steam into the cycle of the gas turbine is water consumption because the steam injected into the cycle is in the end discharged to the atmosphere together with the exhaust unless it is condensed and recovered before the final exhaust. Whilst it is possible to condense the steam and recover most of the water from the exhaust, the exhaust after a condenser is saturated therefore the remaining steam within the low temperature exhaust is ejected to the atmosphere and is visible, under some circumstances, as a plume. The plume is often equated with pollution by the general public and can have a detrimental effect on public opinion. It is therefore desirable to suppress the plume formation.

In U.S. Pat. No. 6,845,738 water within the exhaust of a turbine is condensed, stored and re-used for injecting as steam upstream of the combustor. The heat exchanger as a HRSG upstream of the condenser has water on the secondary side. It is important that the water does not dry up, particularly during startup to ensure that the temperature of the expanded working fluid is kept at a permanently low level when it enters the condenser. Failure to keep the temperature low will result in damage to the condenser itself. When a conventional HRSG is employed, water must always be present in the heat exchanger and it is important that the turbine is started slowly to avoid thermal shock and damage to the HRSG.

In some gas turbine systems, steam is generated in a Once Through Steam Generator (OTSG) and used to power a steam turbine in addition to providing the necessary steam for steam injection. Such a system is described in U.S. Pat. No. 5,727,377. An OTSG does not have the thick walls of the drums of conventional HRSGs, which means that start-up times are generally short. The fast start-up time is achieved, in part, by the capability of the OTSG to run dry i.e. without any water flowing through the tubes on the secondary side of the heat exchanger.

Thus, an OTSG creates a problem unique over conventional HSRG systems, in that components downstream of the OTSG are subjected to gas that has not been cooled in any significant manner. Therefore, the exhaust of an OTSG is conventionally vented to atmosphere through the turbine without any downstream components.

SUMMARY OF THE INVENTION

It is an object of the present invention to seek to provide an improved steam injection gas-turbine power plant.

According to a first aspect of the present invention there is provided a gas turbine engine system comprising in operating series: a compressor system for compressing a working fluid, a combustor downstream of the compressor system, a turbine system downstream of the combustor, vapour generating means downstream of the turbine having a first operating side for containment of the working fluid and a second operating side for containment of a fluid to be vapourised in the vapour generating means by heat transfer with the working fluid, wherein the vapour generating means has a dry-run capability such that the turbine exhaust may pass through the first operating side without a fluid to be vapourised passing through the second operating side, characterised in that the gas turbine engine system further comprises a bypass damper downstream of the first operating side of the vapour generating means and a condenser for condensing condensable fluid from the working fluid, the bypass damper being switchable between a first operating position where the working fluid does not pass through a condenser and a second operating position where the working fluid passes through the condenser.

Preferably the fluid to be vapourised is water and may be injected into the engine system at or upstream of the turbine, and preferably at the combustor.

The condensed condensable fluid may be stored in a vessel and is preferably pumped to the second operating side of the vapour generating means. The condensed fluid may be water.

Preferably the system further comprises a preliminary compressor system upstream of the compressor system and an intercooler downstream of the preliminary compressor system and upstream of the compressor system.

Preferably the system further comprises heating means downstream of the condenser that, in use, provides heat to the working fluid from the cooling fluid containing heat absorbed in the intercooler.

Where the cooling fluid is air and the heating means may be a mixer for mixing the cooling fluid with the working fluid. Where the cooling fluid is water the heating means may be a heat exchanger.

According to a second aspect of the invention there is provided a gas turbine engine system comprising in operating series: a first compressor system for compressing a working fluid, an intercooler downstream of the first compressor system for cooling the working fluid using a cooling fluid, a second compressor system downstream of the intercooler for receiving the cooled working fluid, a combustor downstream of the compressor system, a turbine system downstream of the combustor, a heat exchanger downstream of the turbine system for cooling the working fluid, a condenser downstream of the heat exchanger for condensing fluid from the working fluid, and heating means downstream of the condenser, characterised in that, in use, the heating means provides heat to the working fluid from the cooling fluid containing heat absorbed in the intercooler.

The first compressor system may be a low pressure compressor, or an intermediate pressure compressor. The second compressor system may be an intermediate pressure compressor, where the first compressor system is a low pressure compressor, or a high pressure compressor.

The turbine system may comprise a high pressure turbine and/or an intermediate pressure turbine and/or a low pressure turbine.

Preferably the heating means, in use, provides heat to the working fluid from the cooling fluid containing heat absorbed in the intercooler.

Where the cooling fluid is air and the heating means may be a mixer for mixing the cooling fluid with the working fluid. Where the cooling fluid is water the heating means may be a heat exchanger.

BRIEF DESCRIPTION OF THE DRAWINGS

Embodiments of the present invention will now be described by way of example only and with reference to the accompanying drawings, in which:—

DETAILED DESCRIPTION OF THE INVENTION

Figure 1:
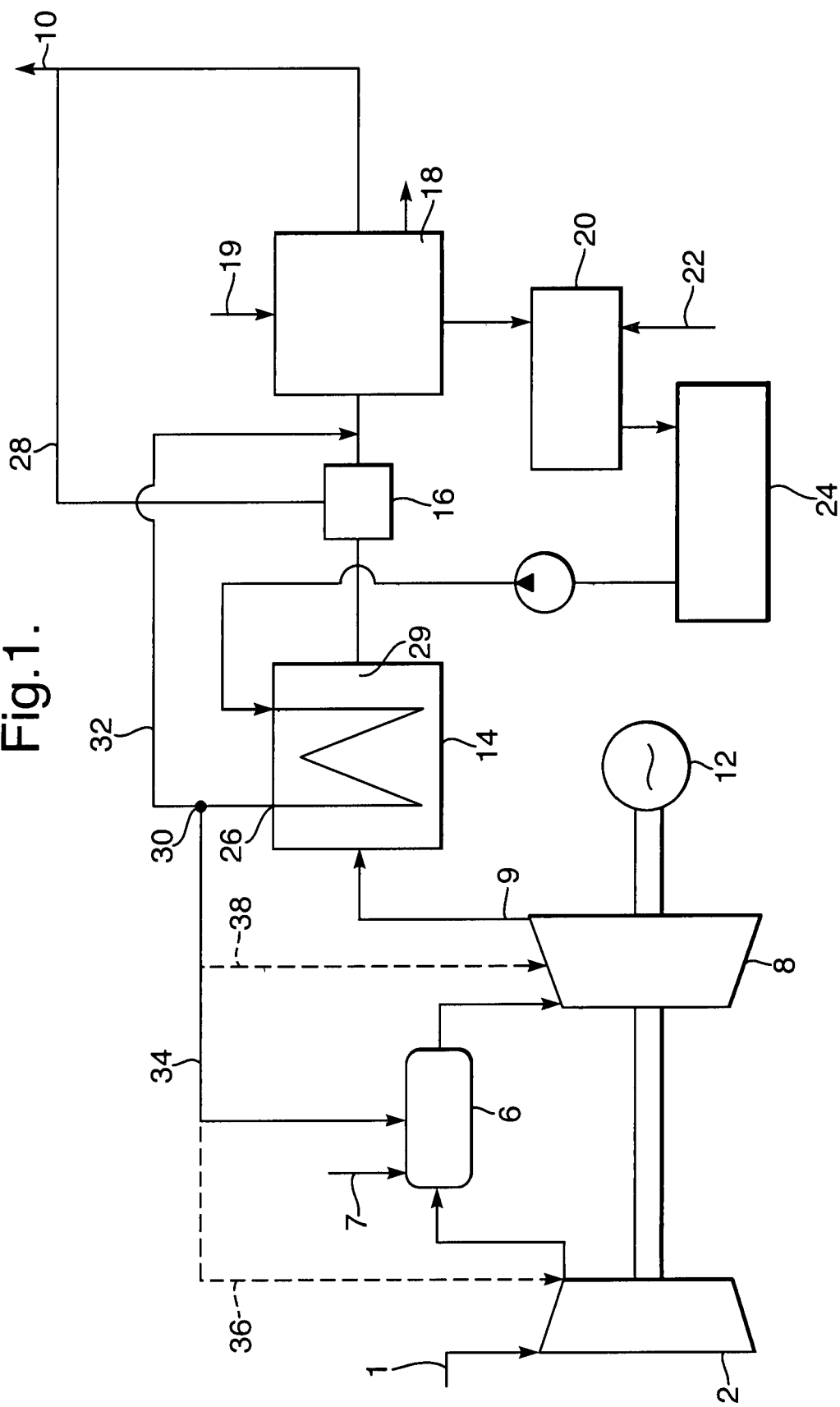
FIG. 1 depicts a steam injection engine system according to a first aspect of the invention.

FIG. 1 shows an intercooled steam injection engine having a condenser and a plume suppression system. Air 1 is fed from an inlet (not shown) through a compressor system 2. The air is compressed and passed to a combustor 6 where fuel 7 is added and combusted. The resultant hot combustion products expand through and thereby drive the turbine system 8 before being exhausted through an exhaust 9. The turbine system is mounted on a shaft or concentric shafts with the compressor system 2 and a generator 12.

Between the turbine exhaust 9 and the engine exhaust 10 there is provided a steam generator to recover heat. Steam is produced in a drum-less once-through type steam generator (OTSG) 14. The use of an OTSG beneficially offers a faster transient response when compared with that of conventional thick walled HRSG, which can take up to two hours to reach operating temperature at start-up. The long start up time for conventional HRSG heat exchangers is to protect the thick walls of the drums from thermal shock caused by temperature differences. This temperature difference is exacerbated by water in the secondary side of the heat exchanger that is heated by the exhaust gasses to generate steam for injection.

The flue gas from the OTSG 14 is passed through a bypass-damper 16, whose function will be described in more detail later, and subsequently to a condenser 18, where water in the exhaust stream is condensed prior to emission from the engine exhaust 10.

The condenser is cooled by a through flow of fluid 19; either water, fuel, air, or some other fluid per availability and design choice.

Water recovered from the exhaust gas stream by the condenser 18 passes to a water-treatment area 20 where impurities are removed and make-up water 22, if required, is added. Treated water is stored, if there is an excess, in a storage tank 24.

The storage tank supplies pressurised water to the secondary side of the OTSG 14 where it is heated and the resultant steam re-injected at design locations in the compressor system 2, combustor 6 and/or turbine system 8.

The Once-Through Steam Generator (OTSG) does not have thick walls used in conventional HRSGs and benefits of a fast start-up capability. The fast start up is achieved, in part, by the capability of the OTSG to be run dry i.e. without any water flowing through the tubes on the secondary side of the heat exchanger. The OTSG must be started dry and water flow through the tubes increased gradually, in a controlled manner, to avoid liquid water at the steam outlet 26 of the OTSG.

The system is provided with a bypass damper downstream of the OTSG that is controlled by a system controller (not shown) to protect the condenser from the hot gas that results from the dry start-up requirements of the OTSG.

At start-up, the bypass damper 16 is open such that the hot gas from the turbine system will be directed through conduit 28 to the engine exhaust 10. The temperature of the turbine exhaust increases the temperature of the OTSG and the flow of water is increased at a gradual controlled rate such that all of the water evaporates before reaching the OTSG steam outlet 26. The evaporating water absorbs heat from the gas turbine exhaust stream 9 and the temperature thereof is reduced. Once the temperature of the gas stream at the OTSG exit 29 is reduced to a level acceptable for the condenser 18 the position of the bypass damper 16 is switched so that the gas from the OTSG exit 29 can flow through the flue gas condenser 18.

The condenser 18 is also protected at shut down by following a similar series of operations. While the coolant 19 still flows through the condenser the power output of the engine is reduced to a level where steam injection, if any, is no longer required to achieve the desired power output from the engine. The position of the bypass damper 16 is changed such that the exhaust from the OTSG bypasses the condenser 18 and passes directly to the engine exhaust 10. Feed water to the OTSG 14 is gradually stopped and consequently steam injection to the combustor, or elsewhere in the gas turbine, is also stopped. Once the water flow through the OTSG is completely stopped, or reduced, to a level such that water will not be exhausted from the OTSG steam outlet 26 the gas turbine may be shut-down conventionally.

At a given feed water pressure to the OTSG the steam dryness and steam temperature from the OTSG outlet is normally a function of the water flow rate through the OTSG against a heat capacity flow rate of the hot gas from the gas turbine. Steam injection to gas turbines always needs steam pressure higher than the pressure at the destination e.g. the combustor, it is not always possible to have freedom of changing the feed water pressure, and thus the saturation temperature, to balance the steam flow rate and the steam dryness. Beneficially, the control of the steam quality, temperature and mass flow in the system in FIG. 1 can be improved by providing a steam bypass, 32 having a valve 30 that controls the split of the air that passes through the bypass conduit rather than retuning to the combustor along conduit 34. The steam condition and its flow rate to the combustor of the gas turbine can be freely defined within the envelope allowed by the flue gas condenser capacity.

The steam bypass line may have an attemperator, or de-superheater, cooling the steam with a water spray before the steam re-joins the exhaust between the damper and the condenser. The steam is cooled to control the temperature at the inlet of the condenser.

Steam may also be taken, either from the steam outlet of the OTSG 26, or from the steam bypass duct 32 to provide heat in a combined heat and power (CHP) application. The amount taken is subject to the demand and capacity of the OTSG 14. Water consumption of the overall system will increase and it may be necessary to provide a pressure regulator or de-super heater/attemperator to condition the steam.

The described gas turbine system enables water to be stored as a provision for hot days. On cold days, or even at night, it is possible to recover more water than necessary for the steam injection into the gas turbine, especially as water is created when fuel is burnt. This surplus water can be stored in the water storage tank as a provision for very hot days which can cause a shortage of water from the flue gas condenser.

The steam injector system can also include an optional conduit 36 for injecting steam into the vicinity of the outlet of the compressor system. Steam may also be injected into the turbine system of the engine through conduit 38. Beneficially this cools the turbine and can provide an additional power boost.

Where there is an excess of dissolved air or $CO_2$ in the water flowing through the OTSG it may be necessary to de-aerate the water. This may be performed using an appropriate conventional de-aerator.

Whilst steam injection gives inherently low NOx emissions, generally of the order 25 ppm for a diffusion flame combustor, occasionally a sub 10 ppm limit is set. To achieve these levels it may be necessary to provide a selective catalytic reduction system as part of the OTSG system.

Figure 2:
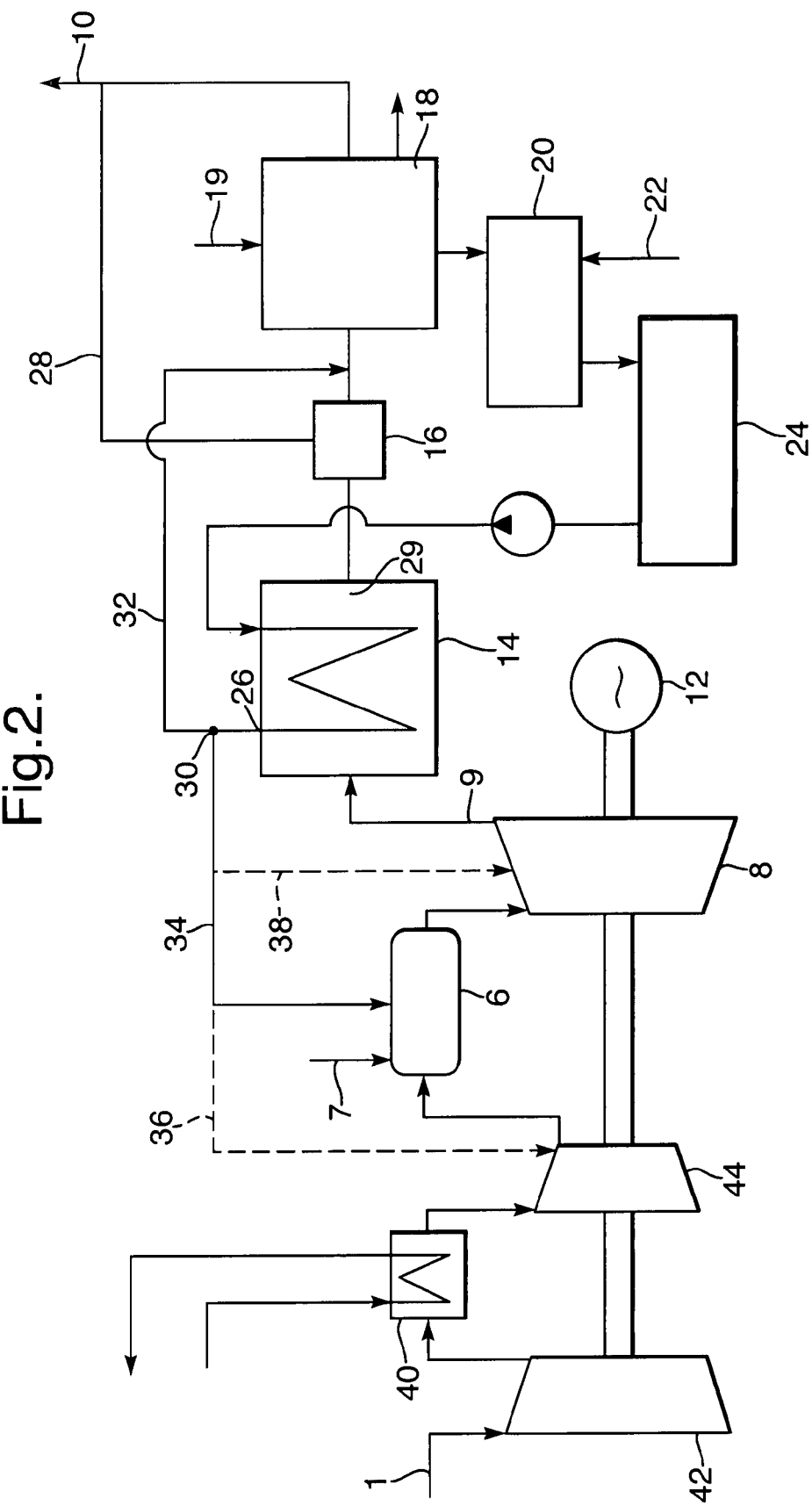
FIG. 2 depicts an intercooled steam injection engine system according to a second embodiment of the first aspect of the invention.

In a further embodiment described in FIG. 2 the gas turbine is provided with an intercooler 40. The intercooler is provided conventionally between a first compressor system 42 and a second compressor system 44. The intercooler cools the working fluid between compressor systems and offers the advantage of high efficiency and high specific power. The plant is less complex and less expensive (per kW) compared with combined cycle gas turbines with a steam turbine, i.e. the steam cycle, as the bottoming cycle, and this is achieved without additional turbo machinery. As the intercooler is on a separate circuit to the OTSG there is flexibility in sizing the heat exchanger and operational flows therethrough.

Figure 3:
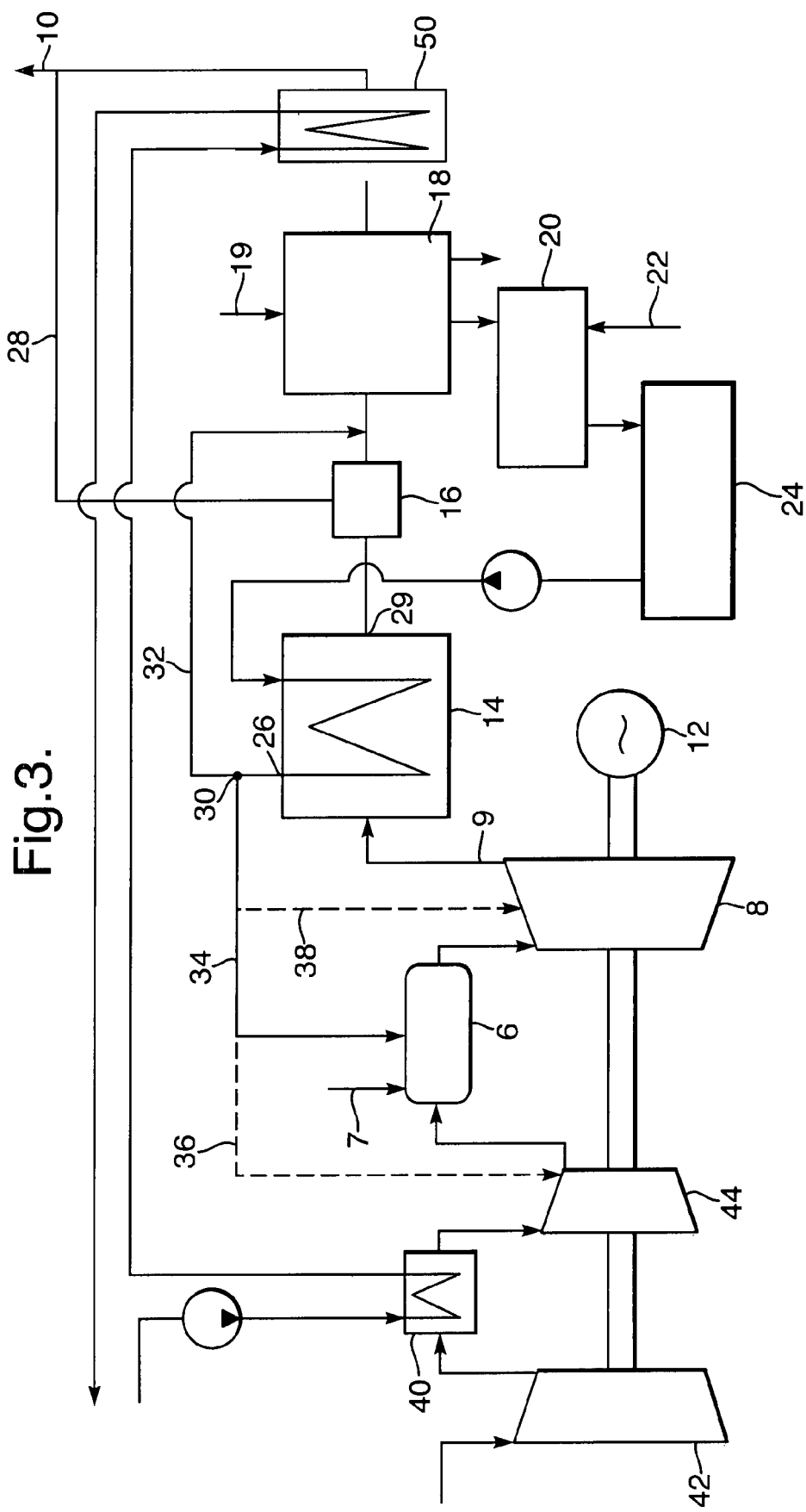
FIG. 3 depicts an intercooled steam injection engine system according to a second aspect of the invention.

In a further embodiment, described with regard to FIG. 3, a flue gas heater 50 is provided in the exhaust duct downstream of the condenser 18. Between the condenser and the flue gas heater the exhaust still has moisture contained therein and the exhaust is saturated at the temperature at which it exits the condenser. Where the exhaust is emitted directly to the atmosphere on a cold day, a plume from the exhaust may be visible.

The advantageous system of FIG. 3 takes fluid that is used as the coolant in the intercooler, which absorbs heat from the compressed gas stream, and uses that fluid as a heat source to suppress the plume. The water heats the exhaust before it is emitted to the atmosphere to move the exhaust away from its saturation condition. Thus, when the exhaust is emitted and mixed with the atmosphere a plume will not be visible.

Figure 4:
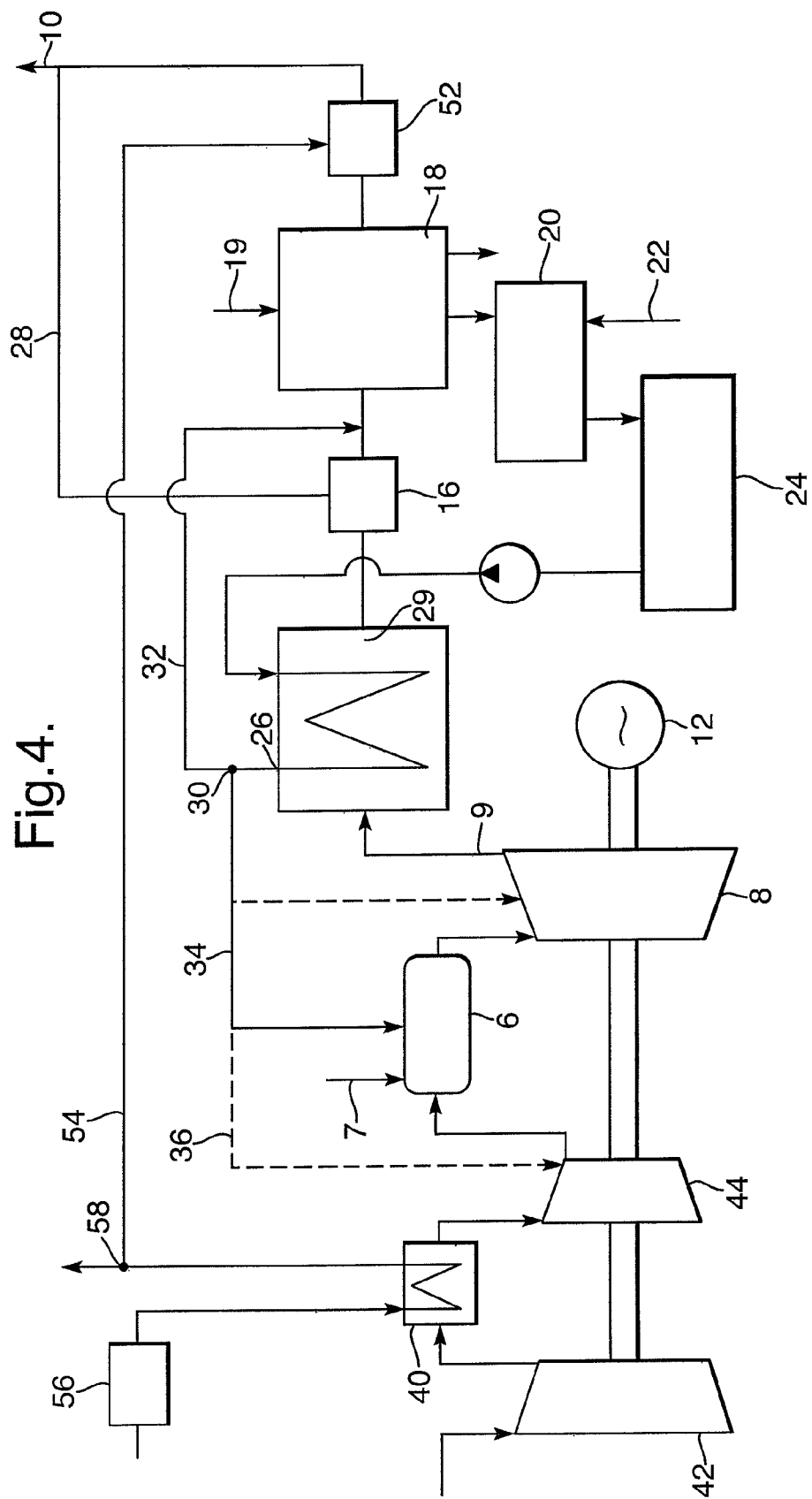
FIG. 4 depicts an intercooled steam injection engine system according to a second embodiment of the second aspect of the invention.

In a further embodiment, described with regard to FIG. 4, the intercooler 40 is cooled by an air flow directed over the intercooler heat exchanger by a fan 56. The air absorbs heat from the compressor flow and a valve 58 is provided in the intercooler circuit to direct a proportion of the air to the gas turbine exhaust along a conduit 54. The intercooler air is mixed with the exhaust stream in a mixer 52 thereby raising the temperature of the exhaust stream away from its saturation point to ensure that no plume is visible, even on cold days.

It will be appreciated that the described systems offer particular advantages for peaking and mid-merit power generation applications. It is possible to configure the system for combined heat and power applications. Ultimately, the system offers competitive customer economics, such as low $ per kW specific costs, a low cost of electricity and high internal rate of return. The system is environmentally adaptive and offers no, or mitigated, water consumption, a plume-less exhaust and an inherently low NOx emission.

Various modifications may be made without departing from the scope of the invention.

For example, where there is optional steam injection to the turbine system, particularly the IP or LP turbines (in case of a 3-shaft engine), or where a steam supply is required for a CHP application, the steam does not necessarily need to be at the higher temperatures and pressures required for steam that is injected into the combustor. Consequently, where design and the various required steam splits make it economical a dual or multi pressure OTSG with separate water circuits may be provided, with each circuit being optimised for the steam destination.

We claim:

1. A gas turbine engine system comprising in operating series:
    a compressor system for compressing a working fluid;
    a combustor downstream of the compressor system;
    a turbine system downstream of the combustor;
    an exhaust flue;
    vapour generating means downstream of the turbine having a first operating side for containment of the working fluid and a second operating side for containment of a liquid fluid to be vapourised in the vapour generating means by heat transfer with the working fluid, wherein the vapour generating means has a dry-run capability such that the turbine exhaust passes through the first operating side without a fluid to be vapourised passing through the second operating side;
    a bypass damper downstream of the first operating side of the vapour generating means; and a condenser for condensing condensable fluid from the working fluid, wherein the bypass damper is switchable between a first operating position, where the working fluid is directed to a bypass conduit which bypasses the condenser before joining the exhaust flue, and a second operating position where the working fluid passes through the condenser to the exhaust flue.

2. A gas turbine engine system according to claim 1, wherein the fluid to be vapourised is water.

3. A gas turbine engine system according to claim 1, wherein, in use, fluid vapourised in the fluid vapourising means is injected into the engine system at or upstream of the turbine system.

4. A gas turbine engine system according to claim 3, wherein, in use, fluid vapourised in the fluid vapourising means is injected into the engine system at the combustor.

5. A gas turbine engine system according to claim 1, wherein condensed condensable fluid is stored in a vessel.

6. A gas turbine engine system according to claim 5, wherein the condensed fluid stored in the vessel is pumped to the second operating side of the vapour generating means.

7. A gas turbine engine system according to claim 5, wherein the condensed fluid is water.

8. A gas turbine engine system according to claim 1, wherein the system further comprises a preliminary compressor system upstream of the compressor system and an intercooler downstream of the preliminary compressor system and upstream of the compressor system.

9. A gas turbine engine system according to claim 8, further comprising heating means downstream of the condenser, characterised in that, in use, the heating means provides heat to the working fluid from the cooling fluid containing heat absorbed in the intercooler.

10. A gas turbine engine system according to claim 9, wherein the cooling fluid is air and the heating means is a mixer for mixing the cooling fluid with the working fluid.

11. A gas turbine engine system according to claim 9, wherein the cooling fluid is water and the heating means is a heat exchanger.

12. A method of operating a gas turbine engine system comprising in operating series:
   a compressor system for compressing a working fluid;
   a combustor downstream of the compressor system;
   a turbine system downstream of the combustor;
   vapour generating means downstream of the turbine having a first operating side for containment of the working fluid and a second operating side for containment of a liquid fluid to be vapourised in the vapour generating means by heat transfer with the working fluid, wherein the vapour generating means has a dry-run capability such that the turbine exhaust passes through the first operating side without a fluid to be vapourised passing through the second operating side;
   a bypass damper downstream of the first operating side of the vapour generating means; and
   a condenser for condensing condensable fluid from the working fluid, wherein the bypass damper is switchable between a first operating position, where the working fluid is directed to a bypass conduit which bypasses the condenser before joining an exhaust flue from which the working fluid is exhausted from the gas turbine engine system, and a second operating position where the working fluid passes through the condenser to the exhaust flue, the method comprising:
supplying the liquid fluid to the vapour generator means;
supplying the working fluid to the vapour generator means; and
vaporizing the liquid fluid in the vapor generator means.

* * * * *